3,328,159
PRODUCTION OF GRANULAR ENRICHED
SUPERPHOSPHATE
Philippe Moraillon, Bois-Guillaume, France, assignor to Compagnie de Saint-Gobain, Neuilly-sur-Seine, France
Filed May 13, 1963, Ser. No. 279,822
Claims priority, application France, May 18, 1962, 898,032
6 Claims. (Cl. 71—37)

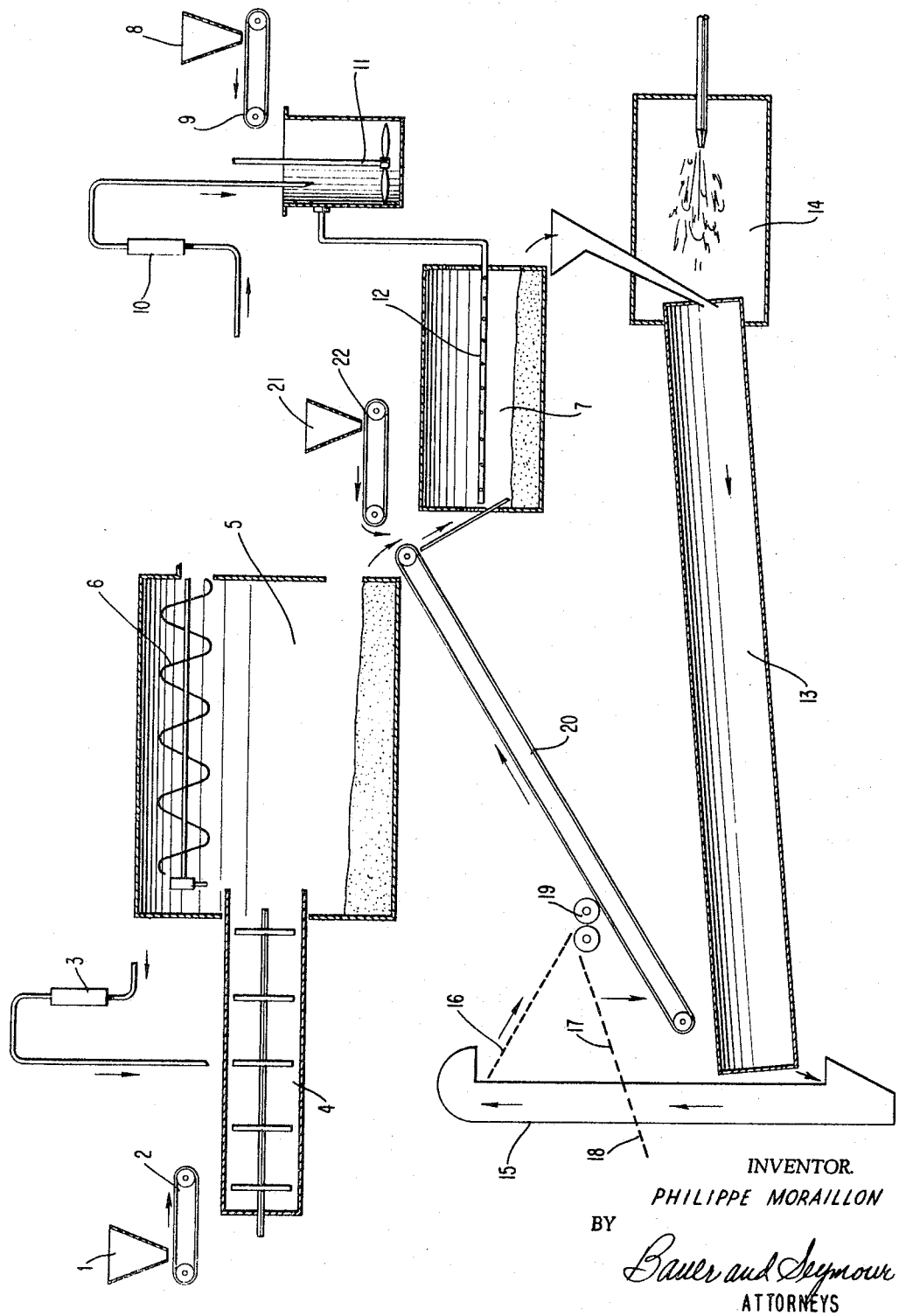

This invention relates to a process for the preparation of granulated phosphate fertilizers having a base of superphosphate enriched with additional $P_2O_5$. The products are believed to be new and contain a $P_2O_5$ content between that of superphosphate and that of triple superphosphate.

Superphosphate has been made in finely divided form, usually a powder, by reacting a finely divided mineral phosphate with sulfuric acid having a concentration between 65 and 75% $H_2SO_4$. The reaction produces a powdery product which is granulated by adding a large amount of water and drying the wet granules of fertilizer which are thus produced. The same process has been used to make superphosphate with an increased content of $P_2O_5$ by replacing a part of the sulfuric acid with phosphoric acid, the concentration of these acids being such that they introduce the amount of water which is necessary to the reactions. Those processes are characterized by the use of large quantities of heat to evaporate the water which is added to the powdery product to make the granules.

Another process has been used to make granulated superphosphate enriched by additional $P_2O_5$ by reacting a finely divided phosphate mineral with a mixture of sulfuric acid and phosphoric acid so diluted as to produce a fluid sludge to which there is added a very large amount of dried final product, the quantities added being sufficient to produce moist grains which are dried in a rotating drun under hot gases. That process requires the use of a large expenditure of heat, the construction of a very large and costly apparatus, and the recycling of many times the amount of fertilizer than is actually sold.

It is an object of the present invention to reduce the size of apparatus employed, to reduce the amount of final product which has to be recycled, and to reduce the consumption of heat in producing a granular fertilizer having a content of $P_2O_5$ between that of superphosphate and that of triple superphosphate.

The objects of the invention are accomplished generally speaking by a method of preparing a granular fertilizer having a $P_2O_5$ content intermediate those of superphosphate and triple superphosphate which comprises preparing finely divided, solid superphosphate by reacting phosphate of fertilizer grade with acid comprising sulfuric acid, separately preparing a sludge by reacting phosphate of fertilizer grade with dilute phosphoric acid, mixing the sludge with dry final product and with the solid superphosphate with agitation in proportions such that the weight of the sludge is at least 15% of the weight of the dry final product, thereby forming granules, and drying the granules.

The raw materials used in the preferred form of the invention are phosphate of fertilizer grade, examples of which are Moroccan phosphate, Florida phosphate and certain high phosphate slags. The acids employed are sulfuric acid and phosphoric acid.

In the preferred form of the invention, phosphate rock is reacted with sulfuric acid to produce superphosphate, and some of the same raw material is separately reacted with dilute phosphoric acid to produce a fluid sludge. The reaction with $H_2SO_4$ produces an ordinary superphosphate in essentially powder form, it being understood that the rock is suitably crushed before the attack. The part of the raw material which is reacted with the phosphoric acid is similarly broken up and attacked by dilute phosphoric acid the product of these two reactions, the powder and the sludge, are mixed, in a mixer-granulator, with recycled dry final product with agitation, which is usually provided by the slow rotation of the granulating drum. As the granules form, they are transferred to a drier, usually a rotating drum drier through which flows a current of hot air. When they are suitably dried, they are screened to remove the marketable sizes from the gross and the fines, the marketable sizes are sent to storage, the gross are crushed, and the fines with the crushed gross are returned to the granulating step. The sizes which are to go to storage are readily selected by the choice of screen size.

In this invention, the amount of sludge from the dilute phosphoric reaction which is mixed with the superphosphate should represent at least 15% and preferably 20% of the total weight of the dry fertilizer produced.

The product is a fertilizer having a base of superphosphate enriched by additional $P_2O_5$.

When the content of $P_2O_5$ in the product is to be relatively high, it is advantageous to attack the phosphate rock in the first step with a mixture of sulfuric and phosphoric acids in concentrations which produce dry powdered superphosphate containing additional $P_2O_5$ derived from the phosphoric acid. The phosphate sludge from the separate phosphoric acid reaction is then mixed with this product and with recycled fertilizer to produce the final product. This has the advantage that it reduces the quantity of the water which must be evaporated in the drier.

The drawing is diagrammatic and represents an apparatus adapted to the commercial use of the process. The phosphate of fertilizer grade, for instance, Moroccan phosphate, is crushed to convenient small size and flows through the hopper 1, through a distributor conveyor 2 from whence it is dropped into mixer 4 into which is simultaneously introduced either sulfuric acid of concentration between 65% and 70% $H_2SO_4$ or a mixture of sulfuric and phosphoric acids, the flow being regulated by flow meter 3. After the residence in the mixer 4, the mixture flows into the reactor 5 which is a rotating drum which turns slowly around its axis, which is almost horizontal, and which is provided with a scraper 6 which cleans the surface of the drum at each revolution.

The reaction mass remains in the reactor 5 long enough to permit solidification and the formation of a powder. The powder falls out of the drum 5 by overflow into a rotating granulator 7 which simultaneously receives the phosphoric acid sludge and the recycled final product.

The phosphoric sludge is prepared in separate apparatus having a hopper 8 which distributes the phosphate of fertilizer grade on the surface of a conveyor belt 9 which delivers the raw material to a vat 11 provided with an agitator which simultaneously receives the flow of dilute phosphoric acid from a flow meter 10. The reaction product, fluid sludge, is discharge by overflow to distributing pipe 12 from whence it falls upon and moistens the mixture of other ingredients. The granulation takes place in rotating drum 7 and the product falls by overflow into drier 13, a rotator drum along which flows hot gases from heater 14. Upon discharge from drier 13 elevator 15 discharges the product to a coarse screen 16 which separates the gross and delivers them to crusher 19 from whence the crushed particles fall upon the conveyor belt 20, which delivers them to the head end of granulator 7 where they mingle with the superphosphate from reactor 5. The intermediate and fine sizes pass through screen 16 and engage screen 17 which retains the marketable size and directs them to storage at 18. The fines pass through screen 17 and are received at belt 20 which transfers them to the granulator. The foregoing distribution of apparatus is illustrative and in no way limitative as substantial modifications can be made.

For example, the mixer-reactor 4–5 may be replaced by a continuous cave, a slow conveyor or the like. Furthermore, granulator 7 and the rotator-drier 13 may be replaced by apparatus which combines granulation and drying, the entire process of mixing the ingredients, granulating and drying, taking place in a single apparatus.

It is within the concept of the invention that one may add additional fertilizing elements to the process so that they may appear in the product, for example KCl or $K_2SO_4$. In this case a hopper 21 supplies a conveyor 22 with a suitable quantity of KCl or the like which is delivered to the hopper end of the granulator, mixing there with a superphosphate from the reactor 5 and the final product from belt 20.

Under the general conditions of operations set forth above, using an apparatus similar to that of the drawing, the following conditions are found to be satisfactory:

The reaction mass remained in the mixer 4 from 30 seconds to 3 minutes; it remained in the rotating drum 5 from 10 minutes to 2 hours, largely depending on the reactively of the phosphate rock employed; the product remained in the granulator 7 from 1 minute to 5 minutes and in the drier 13 from 10 minutes to 30 minutes. The sulfuric acid was used at temperatures between 20 and 60° C; the phosphoric acid, when used in combination with sulfuric acid, was used at 20 to 60° C. The dilute phosphoric acid was used at 20 to 60° C. in reactor 11; the hot gases entered the drier 13 at 250 to 750° C. and issued from the other end at 70 to 150° C. respectively; the fertilizer grains issued from the drier between 60 and 110° C.

The granules of fertilizer are superphosphate with additional $P_2O_5$ and they are of excellent commercial quality having a hardness between 2 and 10 kg. when crushed under the following conditions:

The hardness is measured by applying to selected granules a metallic cylinder 4 mm. in diameter connected to a dynamometer. The dynamometer is read when the grain is crushed. The product is quite uniform and it is usually sufficient to take 20 grains at random and average the result.

The following examples illustrate the invention without limiting the generality of what is illustrated, stated, and claimed herein:

*Example I*

4,750 kg./hr. of Moroccan phosphate containing 32% $P_2O_5$ and 4,100 kg./hr. of sulfuric acid containing 71% of $H_2SO_4$ were put into the mixer of an apparatus similar to that of the drawing, remaining in the mixer about 30 seconds and then passing into a rotating drum reactor in which the mean time of residence was 20 minutes. After release of 700 kg./hr. of water vapor and $CO_2$ gas, with silicon tetrafluoride, the drum discharged at a rate of 8,150 kg./hr. of superphosphate powder which flowed into a rotating granulator with 30,000 kg./hr. of gross and fines which were recycled.

Simultaneously there was introduced into a reaction vat similar to that of the drawing, 930 kg./hr. of the same phosphatic raw material and 2,650 kg./hr. of dilute phosphoric acid containing 30% $P_2O_5$. The temperature of the phosphoric acid was about 40° C. The release of water vapor and $CO_2$ was about 45 kg./hr. The overflow discharged 3,535 kg./hr. of fluid sludge into the granulator, where it was sprayed on to the solids. The mean time of residence in the granulator was about 2 minutes; a total of 41,685 kg./hr. of moist granulated product was discharged into the drier and about 1,685 kg./hr. of water vapor passed off. 40,000 kg./hr. of dry granulated product was discharged from the drier. The temperature of hot gas introduced into the drier was 500° C. and the average time of residence of the product in the drier was 12 minutes.

By screening, 30,000 kg./hr. of dry product constituting gross and fines were recycled, after breaking the gross, to the granulator and 10,000 kg./hr. of product of size between 1 and 4 mm. in diameter was sent to stock for sale.

The fertilizer had a total of 26.15% $P_2O_5$ of which 25–25.5% were soluble in water and alkaline ammonium citrate. 25% of $P_2O_5$ was soluble in water. After aging for 12 hours the hardness of the grains was about 7 kg.

*Example II*

Into the mixer 4 were poured 4,200 kg./hr. of Moroccan phosphate titrating 32% $P_2O_5$, 2,140 kg./hr. of sulfuric acid of 98% $H_2SO_4$, and 2,250 kg./hr. of phosphoric acid of 30% $P_2O_5$. The mean time of the mixture in the mixer was about 30 seconds. The mixture then passed into rotating drum 5 wherein its mean residence was about 20 minutes. After release of 600 kg./hr. of water vapor, $CO_2$ gas, and silicon tetrafluoride, 7,990 kg./hr. of powdery, enriched superphosphate which fell into the granulator 7 together with 30,000 kg./hr. of fines and crushed gross final product from carrier 20.

At the same time there was put into the vat 11, 930 kg./hr. of Moroccan phosphate of 32% $P_2O_5$ and 2,650 kg./hr. of dilute phosphoric acid of 30% $P_2O_5$. The $CO_2$ gas and $H_2O$ vapor was released at about 45 kg./hr. The product passed by overflow granulator 7 by ramp 12 at the rate of 3,535 kg./hr. of a sludge that changed the dry powder to moist granules. The mean residence in the granulator 7 was about 2 minutes. A total of 41,525 kg./hr. of moist granulated product entered the drier 13, from which, after losing 1,525 kg./hr. of water vapor, there issued 40,000 kg./hr. of dry granulated fertilizer. Screening eliminated 30,000 kg./hr. of fines and gross and 10,000 kg./hr. of marketable sizes went to storage for sale. This contained 31.1% $P_2O_5$, 30.0% $P_2O_5$ soluble in alkaline ammonium citrate, and had a hardness of about 7 kg.

As many apparent widely different embodiments of the present invention may be made without departing from the spirit and scope thereof, it is to be understood that the invention is not limited to the specific embodiments.

What is claimed is:

1. A method of preparing a granular fertilizer having a $P_2O_5$ content intermediate those of superphosphate and triple superphosphate which comprises preparing finely divided, solid superphosphate by reacting phosphate of fertilizer grade with acid comprising sulfuric acid, separately preparing a sludge by reacting phosphate of fertilizer grade with phosphoric acid of 25 to 33% $P_2O_5$ content, mixing with the sludge with dry final product in granules of less than 10 mm. and with the solid powdered superphosphate with agitation in proportions such that the weight of the sludge is at least 15% of the weight of the dry final product, thereby forming granules, and drying the granules.

2. The method of making granular fertilizers having a content of $P_2O_5$ between those of superphosphate and triple superphosphate which comprises reacting phosphate of fertilizer grade with sulfuric acid of about 65 to 75% $H_2SO_4$, separately reacting phosphate of fertilizer grade with phosphoric acid of about 25 to 33% $P_2O_5$, mixing the products of the separate reactions with finely divided dry final product in granules of less than 10 mm. with agitation in proportions such that the weight of the sudge is 15–20% of the total weight of said dry final product, and drying the product.

3. The method of claim 2 in which the phosphoric reaction product is not substantially less than 20% by weight of the weight of the final product.

4. A method of preparing fertilizer having a $P_2O_5$ content intermediate those of superphosphate and triple superphosphate which comprises preparing solid powdered superphosphate by reacting phosphate of fertilizer grade with acid comprising sulfuric acid 65 to 75% in concentration, separately preparing a sludge by reacting phosphate of fertilizer grade with phosphoric acid, containing 20 to 40% $P_2O_5$, mixing the sludge with a recycle of dry final product in granules of less than 10 mm. and with the solid superphosphate with agitation in proportions such that the weight of the sludge is at least 15% of the weight of the dry final product, thereby forming granules, and drying the granules.

5. A method of preparing a fertilizer made of granules of 1 to 10 mm. by reacting phosphate of fertilizer grade with a mixture of sulfuric acid 65 to 75% in concentration and of phosphoric acid containing 20 to 40% $P_2O_5$, separately preparing a sludge by reacting phosphate of fertilizer grade with phosphoric acid, containing 20 to 40% $P_2O_5$, mixing the sludge with a recycle of dry final product in granules of less than 10 mm., and with the solid superphosphate with agitation in proportions such that the weight of the sludge is at least 15% of the weight of the dry final product, thereby forming granules, and drying the granules.

6. A method of preparing a fertilizer having a $P_2O_5$ content intermediate those of superphosphate and triple superphosphate comprising the steps of mixing phosphate of fertilizer grade with sulfuric acid 65 to 75% in concentration and with phosphoric acid containing 20 to 40% $P_2O_5$, mingling the mixture after substantial reaction with a recycle of dry final product in granules of less than 10 mm., thereby forming a dry mass, separately preparing a sludge from phosphate of fertilizer grade and phosphoric acid containing 20 to 40% $P_2O_5$, mixing the sludge with said dry mass in proportions so that the sludge is preferably at least 15% of the weight of the dry final product, thereby forming granules, and drying the granules.

References Cited

UNITED STATES PATENTS

| | | | |
|---|---|---|---|
| 1,604,359 | 10/1926 | Larison | 71—37 |
| 2,015,384 | 9/1935 | Nordengren | 71—41 |
| 2,106,223 | 1/1938 | Nordengren | 71—40 |
| 2,361,444 | 10/1944 | Zbornik | 71—41 |
| 2,926,079 | 2/1960 | Smith | 71—64 |
| 3,030,200 | 4/1962 | Harris | 71—37 |

FOREIGN PATENTS

| | | |
|---|---|---|
| 828,882 | 2/1960 | Great Britain. |

DONALL H. SYLVESTER, *Primary Examiner.*

ANTHONY SCIAMANNA, T. D. KILEY,

*Assistant Examiners.*